Patented Feb. 24, 1942

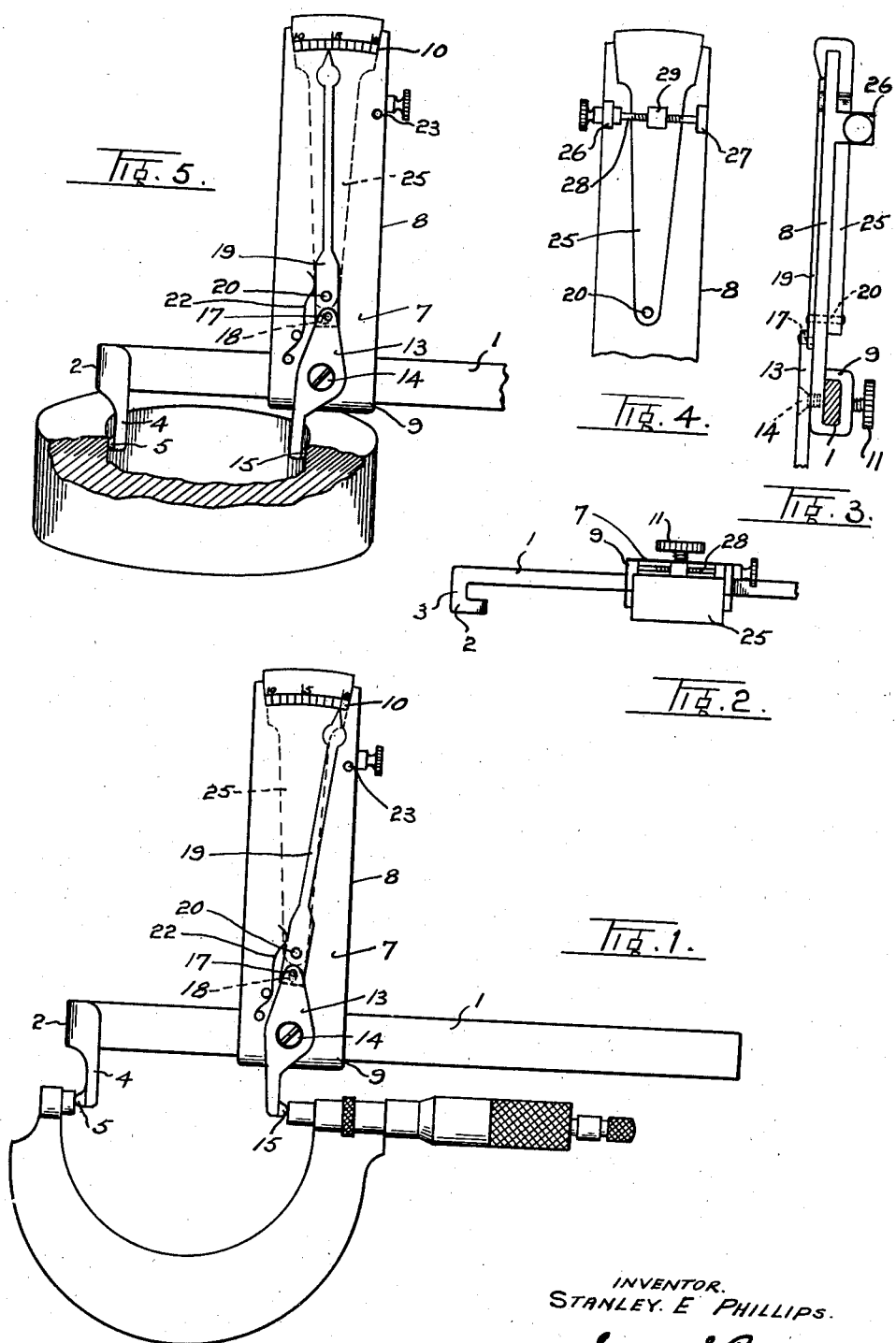

2,274,275

UNITED STATES PATENT OFFICE 2,274,275

INSIDE CALIPER

Stanley E. Phillips, Vancouver, British Columbia, Canada

Application January 29, 1941, Serial No. 376,483

2 Claims. (Cl. 33—148)

My invention relates to improvements in inside calipers or trial gauges.

In boring bearings, cylinders and other cylindrical orifices in a lathe it is usually difficult to determine with accuracy what further depth of cut must be made to obtain the exact dimension which is desired in the final bore and much time is lost through stopping the lathe and inserting an inside micrometer, a gauge pin or other suitable measuring device, and even then it is difficult to be certain that the exact dimension has been secured as the inside micrometer or pin gauge may be fitted a little too tightly or closely.

The object of the invention is to produce an inside caliper with which any desired inside dimension may be gauged by setting the caliper contact points within the corresponding points of an outside micrometer or other appropriate gauge, so that the dimension gauged may coincide exactly with that of the previously set outside micrometer points or gauge; to provide a spring tension for one of the caliper points so that identical readings on the caliper scale will be given when checking the final bore as when setting the caliper to the outside micrometer. A still further object is to provide an inside caliper whereby the exact thickness of cut to be made to enlarge a given bore to the calipered diameter as set in the micrometer used, can be conveniently read on the caliper scale.

The caliper consists of a bar having a fixed ball point and slidably mounted ball point, which latter is adapted to move against spring tension towards the fixed point and is provided with a compound leverage to read on a graduated scale the difference between the desired setting of the slidable point and the distance that it has been moved against said spring tension, as will be more fully described in the following specification and shown in the accompanying drawing, in which—

Fig. 1 is a front elevational view of the invention showing its pointer set at zero and the caliper set to the actual desired diameter.

Fig. 2 is a plan view.

Fig. 3 is an end elevational view of the slide.

Fig. 4 is a fractionated rear elevational view of the slide.

Fig. 5 is a front elevational view of the caliper inserted in a bore and showing the thickness in units of measurement which are required to be turned out to bring the bore to desired diameter.

In the drawing like characters of reference indicate corresponding parts in each figure.

The numeral 1 indicates a bar preferably of rectangular cross section and having a head 2 at one end which is offset by a neck 3 from the bar and is provided with a downwardly extending arm 4 fitted with a ball faced anvil 5. Adjustably mounted upon the bar 1 is a slide 7 which consists of a vertical plate 8 terminating at its lower end with a collar 9 encircling the bar. The plate is provided at its upper extremity with an overhanging arcuate graduated scale 10 representing units of measurement and the collar 9 is provided with a knurled set screw 11, see Figure 2, by which the slide 7 is secured in adjusted position upon the bar 1.

Mounted upon the face of the slide 7 is a rocking lever 13 which is fulcrumed on a pin 14. The lower portion of the lever 13 is provided with a ball or dome shaped contact point 15 which coacts with the anvil 5 as an inside gauge. The anvil 5 and the contact point both lie in a plane parallel to the front face of the bar 1. The upper extremity of the lever 13 is provided with a crank pin 17 which engages a slot 18, shown in dotted line in Figures 1 and 5, which is formed in one end of a pointer 19.

The pointer 19 is pivotally mounted adjacent its lower extremity upon a pin 20 and its upper end is adapted to read upon the scale 10. A spring 22 is mounted upon the plate 8 and is adapted to bear upon one side of the pointer to urge it to a point of rest against a stop 23. The arm and lever movement is so compounded that the reading of the pointer 19 from zero on the scale 10 indicates one half of the measurement between the diameter of the orifice being bored and the diameter of the bore when finished, viz. assuming the inside finish diameter of the bore of a sleeve is to be 2.000 inches and on trial the pointer shows .002, then the inside diameter would be 1.996 and a cut of .002 (pointer reading) would need to be taken to reduce the wall thickness of the sleeve by .002 and increase the inside diameter to 2 inches. This preferred arrangement permits the use of half the normal graduations on the scale 10 and the compound leverage and wide scale graduations relieves the user from possible eye strain or the necessity of close reading.

The graduated scale 10 is carried by a swinging arm 25 which is pivoted at the rear of the vertical plate 8 preferably on the pin 20 so that it may swing about the same radius as the pointer 19. The plate is provided with a slotted bearing lug 26 and a plain bearing lug 27 in which an adjustment screw 28 is mounted. The slotted lug enables the screw to assume positions slightly out of alignment as the swinging arm is moved to either side of its central position as shown. A nut 29 is engaged by the screw 28 which is pivotally connected to the swinging arm 25 so that by turning the screw 28 the arm may be moved to bring the "zero" or any other desired reading of the scale 10 to the pointer 19.

By virtue of the fact that the scale is moved to register with the pointer instead of the pointer being set to register with the scale, there is no need for the user to have that delicate sense of "feel" which is necessary in the setting of many of the precision gauges now in use.

In adjusting the caliper, its slide is moved until the contact points 5 and 15 are in intimate contact with the anvil and spindle contacts of a micrometer and with its pointer 19 away from the stop and close to zero on the scale 10. The scale 10 is then moved by means of the screw 28 until its zero mark is in register with the pointer 19.

In use it suffices to grasp the bar 1 and bring the contact point 15 into contact with one side of the bore diameter and slip the contact point 5 into contact with the opposite side, when the thickness of metal to be removed from the sleeve will be immediately apparent on the graduated scale.

It will be obvious that by the use of this device extremely accurate readings can be obtained and the need for close reading or a delicate sense of feel such as is necessary with inside micrometers or other measuring devices is obviated.

It may be preferred in some instances to use other compound leverage means in place of the rocking lever 13 and pointer 19.

What I claim as my invention is:

1. In a precision measuring device having a bar provided with an anvil, a plate slidable upon the bar, a pivot upon the plate and a pointer upon the pivot, a contact lever upon the plate associated with the pointer, a graduated scale mounted on an axis concentric with the pointer pivot, a screw journalled from the plate and a nut connected with said scale and engaged by the screw for moving the scale to correlate a graduation of said scale with the pointer.

2. A caliper comprising a bar having a depending arm at one end provided with an outwardly extending contact point, a slide adjustable intermediate the length of the bar, said slide having a plate, a lever pivotally mounted on said plate, said lever having at its lower extremity a contact point extending away from the first mentioned contact point, a pivotally mounted pointer upon the plate coupled to the lever and a graduated arcuate scale upon the plate adjacent one end of the pointer and spring means for resiliently holding the pointer at a given graduation on the scale during the setting of the contact points to a predetermined inside measurement, said scale being pivotally mounted upon the plate on an axis concentric to the axis of the pointer, and screw means for moving the scale to correlate a graduation of the scale with the pointer.

STANLEY E. PHILLIPS.